(12) United States Patent
Richert et al.

(10) Patent No.: US 10,029,550 B2
(45) Date of Patent: Jul. 24, 2018

(54) TAPED SEAL CONSTRUCTION

(71) Applicant: 3M INNOVATIVE PROPERTIES COMPANY, St. Paul, MN (US)

(72) Inventors: Detlef Richert, Erkelenz (DE); Andreas Hoefer, Dormagen (DE); Patrick Welter, Neuss (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/898,963

(22) PCT Filed: Jun. 24, 2014

(86) PCT No.: PCT/US2014/043778
§ 371 (c)(1),
(2) Date: Dec. 16, 2015

(87) PCT Pub. No.: WO2014/209943
PCT Pub. Date: Dec. 31, 2014

(65) Prior Publication Data
US 2016/0368355 A1    Dec. 22, 2016

(30) Foreign Application Priority Data
Jun. 24, 2013    (EP) .................................... 13173396

(51) Int. Cl.
*F16J 15/02* (2006.01)
*B60J 10/35* (2016.01)
*C09J 7/24* (2018.01)

(52) U.S. Cl.
CPC ............... *B60J 10/35* (2016.02); *C09J 7/241* (2018.01); *C09J 7/243* (2018.01); *F16J 15/025* (2013.01);
(Continued)

(58) Field of Classification Search
CPC ......... F16J 15/025; F16J 15/027; B60J 10/35; C09J 7/0271; C09J 7/0275;
(Continued)

(56) References Cited

U.S. PATENT DOCUMENTS 4,181,752 A    1/1980 Martens et al.
4,303,485 A    12/1981 Levens
(Continued)

FOREIGN PATENT DOCUMENTS

DE    102006027697    12/2007
DE    102009035813    2/2011
(Continued)

OTHER PUBLICATIONS

International Search Report for PCT International Application No. PCT/US2014/043778 dated Sep. 15, 2014, 4 pages.

*Primary Examiner* — Nathan Cumar

(57) ABSTRACT

A taped seal construction for a body part of a vehicle, with a seal with a main portion and a lip portion, the main portion being designed to extend on one side of the body part of the vehicle and the lip portion being designed to extend on another side of the body part of the vehicle thereby covering an edge of the body part, and a tape, the tape being attached to the main portion of the seal, wherein that the tape comprises a split liner.

19 Claims, 1 Drawing Sheet

(52) U.S. Cl.
CPC ........ *F16J 15/027* (2013.01); *C09J 2205/114* (2013.01); *C09J 2423/006* (2013.01); *C09J 2425/006* (2013.01); *C09J 2433/00* (2013.01)

(58) Field of Classification Search
CPC ............ C09J 2205/114; C09J 2423/006; C09J 2425/006; C09J 2433/00; C09J 7/241; C09J 7/243; Y10T 403/47; Y10T 403/471–403/473
USPC .............. 277/637; 49/435, 466, 475.1, 490.1
See application file for complete search history.

(56) References Cited

U.S. PATENT DOCUMENTS

| | | | |
|---|---|---|---|
| 4,329,384 A | 5/1982 | Vesley et al. | |
| 4,330,590 A | 5/1982 | Vesley | |
| 4,379,201 A | 4/1983 | Heilmann et al. | |
| 4,391,687 A | 7/1983 | Vesley | |
| 4,415,615 A | 11/1983 | Esmay et al. | |
| 4,619,979 A | 10/1986 | Kotnour et al. | |
| 4,833,179 A | 5/1989 | Young et al. | |
| 4,843,134 A | 6/1989 | Kotnour et al. | |
| 5,020,278 A * | 6/1991 | St. Angelo, Jr. ......... | B60J 10/45 49/490.1 |
| 5,124,185 A | 6/1992 | Kerr et al. | |
| 5,296,547 A | 3/1994 | Nestegard et al. | |
| 5,382,451 A | 1/1995 | Johnson et al. | |
| 5,637,646 A | 6/1997 | Ellis | |
| 5,804,610 A | 9/1998 | Hamer et al. | |
| 5,916,654 A | 6/1999 | Phillips et al. | |
| 6,103,152 A | 8/2000 | Gehlsen et al. | |
| 6,692,600 B2 | 2/2004 | Veerasamy et al. | |
| 2002/0056784 A1* | 5/2002 | Davies ................. | B65H 19/102 242/556.1 |
| 2004/0219356 A1* | 11/2004 | Valdez ...................... | C09J 7/00 428/345 |
| 2006/0081322 A1 | 4/2006 | Wiercinski | |
| 2006/0268060 A1* | 11/2006 | Rosa .................... | B41J 2/17536 347/47 |
| 2010/0104807 A1 | 4/2010 | Chiu et al. | |
| 2011/0281964 A1 | 11/2011 | Zmarsly et al. | |
| 2013/0101759 A1 | 4/2013 | Jones | |
| 2015/0079313 A1 | 3/2015 | Vogel-Martin et al. | |

FOREIGN PATENT DOCUMENTS

| | | | |
|---|---|---|---|
| EP | 1262532 | | 4/2005 |
| GB | 2 266 742 | * | 4/1993 |
| GB | 2266742 | | 11/1993 |
| JP | 2000168366 | | 6/2000 |
| JP | 2007008311 | | 1/2007 |
| WO | WO 99/29793 | | 6/1999 |
| WO | WO 00/06637 | | 2/2000 |
| WO | WO 02/097000 | | 12/2002 |
| WO | WO 2004/022368 | | 3/2004 |
| WO | WO 2014/088999 | | 6/2014 |

* cited by examiner

TAPED SEAL CONSTRUCTION

CROSS REFERENCE TO RELATED APPLICATIONS

This application is a national stage filing under 35 U.S.C. 371 of PCT/US2014/043778, filed Jun. 24, 2014, which claims priority to European Application No. 13173396.6, filed Jun. 24, 2013, the disclosures of which are incorporated by reference in their entireties herein.

FIELD OF THE INVENTION

The invention relates to a taped seal construction and, in particular, to such a construction for a body part of a vehicle. The invention also relates to a method of applying a taped seal construction to a body part of a vehicle.

BACKGROUND

Shaped rubber articles, are frequently used for gaskets and automotive weatherstrip seals. The seals are typically attached to a respective surface like, for example, an automobile frame. They may be attached by means of a pressure sensitive adhesive which provides easy handling and performance advantages such as excellent sealing and low weight compared to other systems like liquid adhesives or mechanical attachment. Such a seal is for example disclosed in DE 10 2009 035 813 A1. The seals disclosed in this application have different shapes. Some of them comprise a main portion and a lip portion. WO 2004/022 368 A1 discloses a sealing profile designed to seal a gab between the outer border of a motor vehicle door and its associated opening in a vehicle body. Said profile has a tubular construction as well as an adhesive region for fixing the profile to one of those borders. EP 1 262 532 A1 describes a dual-functional tape which is used for bonding e.g. rubber gaskets or seals to a body of a vehicle, in particular a motor vehicle such as a car. The tape comprises a heat-activatable adhesive resin layer as well as a pressure-sensitive adhesive layer and may be bonded to e.g. a shaped rubber gasket via a lamination process using conventional heat-bond laminating equipment. WO 99/29793 describes a process for binding a pressure sensitive adhesive to a rubber article. The document also describes an assembly comprising a shaped rubber article heat laminated to an adhesive. US 2006/0081322 A1 teaches the use of a pre-split liner on waterproofing sealants for flashing applications in windows or doors of houses.

In the automotive industry there is a need to provide a taped seal construction that may be applied to a body part of a vehicle in an easy and time saving manner. This need exists for example when seals get applied manually to body parts. This is done in the automotive industry for example in the beginning of a series production and/or with small series.

SUMMARY OF THE INVENTION

In one aspect of the present invention, a taped seal construction is provided for a body part of a vehicle, with the construction comprising a seal with a main portion and a lip portion, and a tape. The main portion is designed to extend on one side of the body part of the vehicle, and the lip portion is designed to extend on another side of the body part of the vehicle, thereby covering an edge of the body part. The tape is attached to the main portion of the seal, and the tape comprises a split liner.

In another aspect of the present invention, a method of applying a taped seal construction to a body part of a vehicle is provided, where the taped seal construction comprises a seal and a tape, and the tape comprises a split liner consisting of at least two parts. The method comprises the following steps: removing a first part of the liner; applying the taped seal construction to the body part of the vehicle with that portion of the tape that was covered by the first part of the liner; checking the position of the taped seal construction; correcting the position of the taped seal construction, if necessary; removing the second part of the liner; and applying the taped seal construction to the body part of the vehicle with that portion of the tape that was covered by the second part of the liner.

In an additional aspect of the present invention, a motor vehicle is provided that comprises a taped seal construction as described or claimed herein.

BRIEF DESCRIPTION OF THE DRAWINGS

The invention will now be described in more detail with reference to the following Figures exemplifying particular embodiments of the invention.

DETAILED DESCRIPTION

Figure 1:
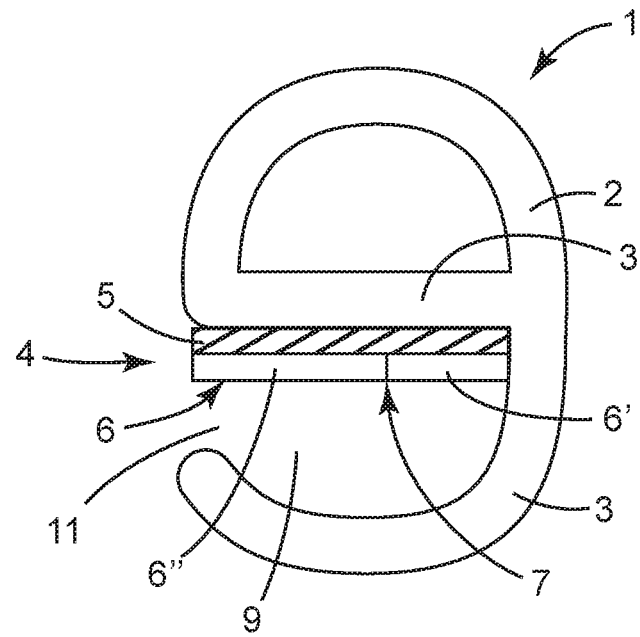
FIG. 1 is a cross sectional view of a first embodiment of a taped seal construction for a body part of a vehicle according to the invention with a curved elongated lip portion.

Herein below various embodiments of the present invention are described and shown in the drawings wherein like elements are provided with the same reference numbers.

Taped seal constructions for body parts of a vehicle usually have an elongated profile. For example, the profile can extend over a certain distance with the same cross sectional shape. The cross section of the profile extends perpendicular to the direction of the longitudinal extension of the profile. For the following, the two directions are defined as the direction of the longitudinal extension and the direction of the cross section.

The seal may be a shaped rubber article such as a seal or a gasket for a body part of a vehicle. The seal may be made out of for example, ethylene-propylene copolymers, ethylene propylene-diene terpolymers and/or styrene-butadiene copolymers or any other suitable material for seal applications in the automotive industry.

The seal comprises a main portion and a lip portion. The main portion is designed to extend on one side of the body part of the vehicle and the lip portion is designed to extend on another side of the body part of the vehicle. The other side may be the edge side (side which is perpendicular to the one side of the body part) or the opposite side of the one side of the body part. The lip portion thereby covers the edge or edge side of the body part of the vehicle. Independent of the shape of the lip portion, the lip portion is always designed such that it extends through a plain which extends along the body part of the vehicle such that the main portion of the seal is arranged on one side of this plain and the lip portion of the seal is arranged such that it extends through this plain, thereby covering at least one other side of the main portion of the seal. The other side could be the edge side or the opposite side of the body part.

In the cross sectional view of the seal, the main portion of the seal may have any kind of shape which is suitable for sealing body parts of a vehicle, such as for example a round shape, a triangular shape, a rectangular shape an oval shape etc. The main portion may be hollow or it may be filled with a suitable material. It may also for example provide several hollow chambers.

In the cross sectional view of the seal, the lip portion of the seal may have any kind of shape which is suitable for acting as an abutment for the body part of the vehicle and/or for covering this body part as well as any other kind of parts of the vehicle, such as for example an interior trim part or panel. The lip portion may be made out of the same material as the main portion or it may be made out of a different material as the lip portion. The lip portion and the main portion may be made out of one piece our out of separate pieces that are fixed, e.g. adhered to each other. Finally the lip portion may have any kind of shape, e.g. a curved shape or an elongated shape.

The body part of the vehicle, e.g. a passenger vehicle, may be for example an engine hood, a trunk, a body door or a roof part of a passenger vehicle. It may be made out of metal, plastic or composite material e.g. fiber reinforced plastic or the like or any other kind of material that is suitable for being used as a body part of a vehicle.

The liner according to the invention is a release liner, which can be a paper or film used on labels and adhesive tapes to cover the adhesive until ready for use. The liner may be made out of paper, polyethylene or any other suitable kind of plastic. The liner may have at least one siliconized surface.

According to the invention, the liner of the tap is at least partially split. In other words, the liner comprises in at least a portion two separate portions, which may or may not be connected a one point. Splitting of the liner may be achieved by cutting the liner before applying or laminating it to the tape. It may also be achieved by taking at least two separate liners and applying or laminating the separate liners to the tape. The liner may also be cut or split after it has been applied or laminated to the tape. The cut or split may have any appropriate shape. It may have a linear shape or a curved shape. It may extend along the complete longitudinal extension of the taped seal construction or only along parts of the longitudinal extension. The cut may extend continuously along the longitudinal extension or it may extend discontinuously along the longitudinal extension of the taped seal construction. The cut or split may be a perforation.

The construction according to the invention provides the possibility of removing a part of the liner, pre-positioning the seal to a substrate, e.g. a body part of a vehicle, correcting the position of the seal relative to the substrate if necessary, removing the remaining part of the liner and finally attaching the seal to the substrate. This possibility is especially advantageous, when seals get manually applied to body parts of vehicles.

The adhesive tape for attaching the item to the substrate may have a substantially flat shape with a first main surface and an opposite second main surface. The surfaces may be parallel to each other. The first surface may be attached to the main portion of the seal. The second surface may be covered by a liner. In the mounted stage, which is the stage, when the seal is finally attached to the body part of the vehicle, the liner is removed and the opposite second surface of the tape extends in the same plain as the plain of the body part of the vehicle.

The tape may comprise a heat-activatable adhesive layer and a pressure-sensitive adhesive layer, wherein the heat-activatable adhesive layer may face the seal. The tape may be laminated to the main portion of the seal. Any other kind of adhesives may be used as well. It is also possible to bond the adhesive to the seal with a primer solution or a primer activatable solution.

The heat-activatable adhesive layer may be a resin layer, wherein the resin is a polymer of one or more monomers selected from the group consisting of olefins. Suitable commercially available heat-activatable polyolefins include polypropylene copolymers of the trade name Finapro™, such as those of the designation Finapro 5660, Finapro 8780, Finapro 5642, and Finapro 5712 (available from ATOFINA Petrochemichals), ethylene/propylene copolymers of the trade name Eltex P™, such as KS 414, KS 409, or KL 467 (available from Solvay Polymers), or those of the trade designation Novolen™, such as MC 3200 (available from Targor GmbH, Ludwigshafen, Germany).

The pressure-sensitive adhesive layer may comprise an acrylic-type pressure sensitive adhesive. Further examples for the heat-activatable adhesive layer and the pressure-sensitive adhesive layer will be described below.

The lip portion may have in the cross sectional view an elongated and/or curved shape, wherein one end of the lip portion is fixed to the main portion of the seal. The lip portion of may cover or extend over the tape with the liner thereby enclosing a space with an opening. The space may be enclosed on one side by the main portion of the seal with the tape and the liner and on the opposite side by the lip portion. The opposite end of the lip may be directed towards the opening of the space. The lip portion may act as an abutment for the body part of the vehicle.

It is also possible to have a lip portion with any kind of other shape. It may for example extend in a direction essentially perpendicular to the tape with the liner, which is also perpendicular to the plain of the body part of the vehicle. When the adhesive tape has a substantially flat shape with a first main surface and an opposite second main surface, the lip portion may extend essentially perpendicular to the extension of these two surfaces. The lip portion may act as an abutment for the body part of the vehicle.

The liner may be completely split, such that it consists of at least two parts. It is also possible that the liner exists of more than two parts. The split of the liner may also be partially, like for example perforated, such that the parts of the liner are still connected with each other but may be detached from each other by applying a force on at least one part.

The liner may be split along the direction of the longitudinal extension of the taped seal construction according to the invention. This construction provides the possibility to remove the first part of the liner along the entire length of the taped seal according to the invention, pre-position the seal to a substrate along the entire length of the seal, correct the position of the seal relative to the substrate if necessary, remove the remaining part of the liner along the entire length and finally attach the seal completely to the substrate.

The liner may be split such that the two liner parts have different width in a cross sectional view perpendicular to the direction of the longitudinal extension of the taped seal construction. Such a construction provides the advantage, of a relatively smaller exposed surface of the tape after removing of the liner, with the benefit of smaller adhesive forces relative to the substrate and with the possibility of easy correcting the position of the seal. The liner part with the smaller width may be located closer to the portion of the seal, where the lip portion is fixed to the main portion and the liner part with the bigger width may be located farer away from the portion of the seal, where the lip portion is fixed to the main portion. When the lip has a curved shape, the liner part with the bigger width may be located closer to the opening of the space. Having the smaller part closer to the lip portion makes it possible to easily remove the second part of the liner in a direction parallel to the plain of the body part of the vehicle and away from the lip portion.

The width of the two liner parts may vary along the length of the taped seal construction. They may vary in with repetitive pattern or in any irregular way.

The invention also comprises a method of applying a taped seal construction to a body part of a vehicle, the taped seal construction comprising a seal and a tape, wherein the tape comprises a split liner consisting of at least two parts. The method comprising the following steps:

removing a first part of the liner;
applying the taped seal construction to the body part of the vehicle with that portion of the tape that was covered by the first part of the liner;
checking the position of the taped seal construction relative to the body part of the vehicle;
correcting the position of the taped seal construction, if necessary;
removing the second part of the liner and
applying the taped seal construction to the body part of the vehicle with that portion of the tape that was covered by the second part of the liner.

Furthermore the invention relates to a motor vehicle comprising a composite article according to the above description.

Adhesive Tape:

The adhesive tape in accordance with the current invention may comprise a heat activatable layer, a foam layer and a pressure-sensitive adhesive layer.

Preferably the adhesive resin used in the heat-activatable (adhesive resin) layer is a polymer of one or more olefinic monomers and is hereinafter also referred to as a heat-activatable polyolefin.

The term "heat-activatable" is conventionally used in the art of adhesive technology and means that in order to "activate" the adhesive it needs to be subjected to a heat treatment, typically between about 60° C. and about 200° C., so as to allow the heat-activatable resin layer to bond to the desired substrate. It is preferred that the surface of the HAA layer be softened applying temperature near its softening point, most preferably slightly above its melting point to achieve a good bond. Examples of useful heat-activatable polyolefin resins are polyolefin homopolymers, such as polyethylene, polypropylene, polyolefin/polyolefin copolymers, such as ethylene/propylene copolymers (often referred to as polyallomer) and blends thereof. Suitable blends include blends of polyethylene and polypropylene at various ratios. Suitable copolymers may be atactic, isotactic, random, block or impact copolymers.

Preferred heat-activatable polyolefin resins of the invention effectively adhere to both thermoplastic and thermoset substrates. The adhesives achieve a high degree of compatible interfacial mixing with a thermoplastic substrate while molten, which upon cooling yields a high-strength bond. With a thermoset substrate, the molten adhesives achieve a superior wetting out of the substrate surface, again yielding a high bond strength when cooled.

In one embodiment of the present invention, a propylene/ethylene copolymer having an ethylene content of up to about 10% by weight is preferred for use in the heat-activatable adhesive resin layer.

Polyolefin polymers which have been toughened and made impact resistant by means of incorporation of elastomeric segments into the polymeric chain my also be useful. Suitable impact copolymers include impact copolymer based on polypropylene or on polyethylene, for example impact polypropylene copolymer containing an ethylene-propylene elastomeric phase.

In another embodiment, the resin is a blend of polyethylene and polypropylene. Preferably, the polyethylene is used in an amount of 5 to 30% by weight, more preferably of 10 to 23% by weight, based on the total weight of the blend and the polypropylene is used in an amount of 95 to 70% by weight, more preferably in an amount of 90 to 77% by weight, based on the total weight of the blend.

The heat-activatable adhesive resin in accordance with the present invention preferably exhibits one of the features selected from a melting point of about 120 to about 170° C. (preferably of about 130 to about 165° C.), a melt flow index of about 2 to 18 g/10 Min (preferably of about 5 to 9 g/10 min), a tensile strength at break of about 25 to about 45 N/cm$^2$ (preferably between 30 to 40 N/cm$^2$), an e-modulus at 100% elongation of about 10 to 20 N/cm$^2$ (preferably of about 12 to about 16 N/cm$^2$), and an elongation at break of about 200 to about 450% (preferably of about 230 to about 400%). More preferably, the heat-activatable adhesive resin exhibits at least two, more preferably at least three, and even more preferably all of the aforementioned features.

Suitable commercially available heat-activatable polyolefins include polypropylene copolymers of the trade name Finapro™, such as those of the designation Finapro 5660, Finapro 8780, Finapro 5642, and Finapro 5712 (available from ATOFINA Petrochemicals), Ethylene/Propylene Copolymers of the trade name Eltex P™, such as KS 414, KS 409, or KL 467 (available from Solvay Polymers), or those of the trade designation Novolen (TMI, such as MC 3200 (available from Targor GmbH, Ludwigshafen, Germany)).

The thickness of the HAA layer is determined by the end-use of the adhesive tape typical thicknesses being in the range of about 30 to 300 μm.

The adhesive tape, in accordance with the current invention, may comprise a foam layer having an acrylic polymer obtainable by polymerization of a polymerizable composition comprising one or more alkyl acrylates having an average of 3 to 14 carbon atoms in the alkyl group. In a particular embodiment, the polymerizable composition further includes one or more polar monomers and/or one or more multi-functional monomers having at least two free radical polymerizable groups.

In particular embodiment, the foam layer has pressure sensitive adhesive properties.

The one or more alkyl (meth)acrylates of the polymerizable composition are typically mono-functional monomers and include in particular alkyl (meth)acrylic acid ester of a non-tertiary alcohol in which the alkyl group contains at least about 3 carbon atoms (on average), and preferably contain an alkyl group comprising from 1 to 30, from 1 to 20, or even from 1 to 15 carbon atoms.

Examples of classes of suitable alkyl (meth)acrylic acid esters for use herein include, but are not limited to, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, iso-pentyl (meth)acrylate (i.e., iso-amyl (meth)acrylate), 3-pentyl (meth)acrylate, 2-methyl-1-butyl (meth)acrylate, 3-methyl-1-butyl (meth)acrylate, stearyl (meth)acrylate, phenyl (meth)acrylate, n-hexyl (meth)acrylate, iso-hexyl (meth)acrylate, cyclohexyl (meth)acrylate, 2-methyl-1-pentyl (meth)acrylate, 3-methyl-1-pentyl (meth)acrylate, 4-methyl-2-pentyl (meth)acrylate, 2-ethyl-1-butyl (meth)acrylate, 2-methy-1-hexyl (meth)acrylate, 3,5,5-trimethyl-1-hexyl (meth)acrylate, cyclohexyl (meth)acrylate, 3-heptyl (meth)acrylate, benzyl (meth)acrylate, n-octyl (meth)acrylate, iso-octyl (meth)acrylate, 2-octyl (meth) acrylate, 2-ethyl-1-hexyl (meth)acrylate, n-decyl (meth) acrylate, iso-decyl (meth)acrylate, isobornyl (meth)acrylate, 2-propylheptyl (meth)acrylate, isononyl (meth)acrylate, isophoryl (meth)acrylate, n-dodecyl (meth)acrylate (i.e., lauryl (meth)acrylate), n-tridecyl (meth)acrylate, iso-tridecyl (meth)acrylate, 3,7-dimethyl-octyl (meth)acrylate, and any combinations or mixtures thereof.

Various combinations of such monomers can be employed. For example, a combination of two or more alkyl(meth) acrylates may be used such as a combination of 2-ethylhexyl acrylate and isooctyl acrylate.

In a particular embodiment, the polymerizable composition further includes one or more polar monomers, typically monofunctional polar monomers. Examples thereof include in particular acidic monomers such as carboxylic acid monomers as well as various acrylamides. Particular examples of polar monomers include acrylic acid, methacrylic acid, itaconic acid, maleic acid, fumaric acid, 2-hydroxyethyl acrylate or methacrylate, N-vinyl pyrrolidone, N-vinyl caprolactam, acrylamide, methacrylamide, N-substituted and N,N-disubstituted acrylamides such as N-ethyl acrylamide, N-hydroxyethyl acrylamide, N,N-dimethyl acrylamide, N,N-diethyl acrylamide, and N-ethyl-N-dihydroxyethyl acrylamide, acrylonitrile, methacrylonitrile and maleic anhydride. Preferred polar monomers include, but are not limited to, acrylic acid, itaconic acid, N,N-dimethyl acrylamide, acryl amide, N-vinyl pyrrolidone and N-vinyl caprolactam. Various combinations of such polar monomers can be employed and in a particular embodiment a combination of two or more polar monomers is contemplated such as for example a combination of acrylic acid and itaconic acid.

In a particular embodiment, the polymerizable composition from which the acrylic polymer of the foam layer can be derived further includes one or more multi-functional monomers that have two or more ethylenically unsaturated groups. Examples of multi-functional monomers include in particular multi-functional acrylic monomers but other multi-functional monomers such as butadiene and substituted triazines such as vinyl-halomethyl-s-triazine type compounds such as for example 2,4-bis(trichloromethyl)-6-p-methoxystyryl-s-triazine. Preferred are polyacrylic-functional monomers such as, for example, pentaerythritol tetraacrylate, tripropyleneglycoldiacrylate, 1,12-dodecane-diol diacrylate. Particular preferred examples of multi-functional acrylic monomers include 1,2 ethylene glycol diacrylate, hexane diol diacrylate and trimethylol propane triacrylate. The multi-functional monomers, when included in the polymerizable composition from which the acrylic polymer may be obtained are typically present in an amount of 0.01 and 1%.

In particular embodiments, the acrylic polymer of the foam layer is typically obtainable from a polymerizable composition having a major amount of the one or more alkyl acrylates, for example at least 84% by weight (based on the total weight of monomers in the composition). A typical range is from 84 to 97% by weight or from 88 to 94% by weight.

When present, the amount of multi-functional monomer or monomers in the polymerizable composition is typically at least 0.01% by weight and may range for example from 0.01% by weight to 1% or less by weight of the total weight of monomers in the composition or for example from 0.1 to 0.5% by weight. The polar monomer or monomers, when included, are typically present in amount of at least 3% by weight of the total weight of monomers in the composition, an exemplary range being from 3 to 16% or from 5 to 12% by weight.

The polymerizable composition may contain further components including in particular a thixotropic agent. Examples of thixotropic agents include fumed silica. The polymerizable composition may also contain microspheres such as for example hollow glass bubbles or polymeric microspheres. Furthermore, it may be desirable to include a surfactant in the polymerizable composition. Tackifiers, in particular tackifiers suitable for use with acrylic adhesives may be added as well. Examples thereof include in particular rosin esters, aromatic resins, aliphatic resins, terpenes and partially hydrogenated and hydrogenated resins. Optionally also pigments as further additives may be included in the polymerizable composition such as e.g. carbon black and the like.

The polymerizable composition typically also includes an initiator for initiating a free radical polymerization including thermal as well as photo-initiators. Photoinitiators are preferred for use in connection with this invention. Examples of suitable photoinitiators can be found in U.S. Pat. No. 4,181, 752 (Martens et al.), U.S. Pat. No. 4,833,179 (Young et al.), U.S. Pat. No. 5,804,610 (Hamer et al.), U.S. Pat. No. 5,382,451 (Johnson et al.), U.S. Pat. No. 4,619,979 (Kotnour et al.), U.S. Pat. No. 4,843,134 (Kotnour et al.), and U.S. Pat. No. 5,637,646 (Ellis). A particular example includes 2,2 dimethoxy-2-phenylacetophenone.

The foam layer of the adhesive tape will typically have a thickness of at least 0.1 mm, for example at least 0.2 mm. A typical thickness range for the foam layer is from 0.25 mm up to 3 mm, for example from 0.3 mm up to 2.5 mm or from 0.4 mm to 2 mm.

In one embodiment, the foam layer is typically obtained and produced according to the methods described in U.S. Pat. No. 4,415,615. The process typically comprises frothing the polymerizable composition, coating the froth on a backing such as for example a release liner and polymerizing the polymerizable composition.

Frothing is conveniently accomplished by whipping a gas into the polymerizable composition. Useful frothing gases typically are inert and include nitrogen gas or carbon dioxide. In a particular embodiment, the monomers of the polymerizable composition may be partially polymerized prior to frothing so as to achieve a desirable viscosity for the frothing step. Useful viscosities to froth a composition are typically between 1000 and 40,0000 cps. The viscosity is typically selected so as to achieve a desired cell uniformity. For example, above 5000 cps, higher cell uniformity will typically be obtained.

Additionally and alternatively to using prepolymerization to achieve a desired viscosity, a thixotropic agent such as fumed silica may be used. In such case, polymerization may be carried out in one step.

Polymerization of the polymerizable composition may be carried out by heat activation but preferably is photoinitiated and hence the polymerizable composition will typically contain a photoinitiator. Typically, photoinitiation is carried out by UV irradiation and a UV initiator will be used. If the polymerization is carried out in two steps (in case of pre-polymerization to enable a suitable viscosity as described above), the amount of photoinitiator initially used may be enough to allow initiation of further polymerization.

Typically however, a further addition of photoinitiator may be desired to initiate further polymerization following frothing.

When the polymerization is to be effected by ultraviolet radiation, the polymerizable coating is preferably protected from air by a plastic film overlay which is fairly transparent to ultraviolet radiation and has a low-adhesion surface. Biaxially-oriented polyethylene terephthalate film which is about 75% transparent to ultraviolet radiation is very useful. If the underlying backing also has a low-adhesion surface, both the backing and the transparent plastic film can be stripped away so that the cellular adhesive membrane may be used for mounting objects. For such use, the cellular membrane may be reinforced by a tissue-like web to avoid becoming distorted if it is to be removed from both the backing and the transparent overlay before being applied.

If instead of covering the polymerizable coating, the polymerization is to be carried out in an inert atmosphere, the permissible oxygen content of the inert atmosphere can be increased by mixing into the polymerizable composition an oxidizable tin compound as taught in U.S. Pat. No. 4,303,485 (Levens), which also teaches that by doing so, thick coatings can be polymerized in air.

Regardless of the process by which the cellular structure of the adhesive is created, it is preferred to include a surfactant in the composition, preferably a silicone or fluorochemical known to be useful for foaming organic liquids that have low surface tension.

By doing so, foams with a good uniformity can be produced wherein the foam cells have an average diameter within the range of 0.05 to 0.3 mm. Typically, 90% of the foam cells vary in size no more than 2:1.

In addition to or alternative to the use of frothing to obtain a foam layer, hollow microspheres may be included in the polymerizable composition. The microspheres may include expandable and non-expandable microspheres. Expandable microspheres (hereinafter also called microballoons) are spheres that expand upon heating and include in particular expandable polymeric microspheres that include a polymer shell and a core material in the form of a gas, liquid or combination thereof that expands upon heating. An expandable microsphere is one where the shell can initially be expanded or further expanded without breaking.

Microballoons or microspheres are approximately spherical hollow bodies having an elastic and thermoplastic polymer shell, accordingly, they are also referred to as expandable polymeric microspheres or as hollow microbeads. Microballoons are filled with low-boiling liquids or with liquefied gas. Shell materials used include more particularly polyacrylonitrile, polyvinyl dichloride (PVDC), polyvinyl chloride (PVC), polyamides or polyacrylates. Suitable low-boiling liquids are, more particularly, hydrocarbons of the lower alkanes, for example isobutane or isopentane, which are enclosed as liquefied gas under pressure in the polymer shell.

Action on the microballoons—more particularly by supply of heat or generation of heat, as for example by ultrasound or microwave radiation—causes, first, a softening of the outer polymer shell, while at the same time the liquid blowing gas present in the shell undergoes transitions of its gaseous state. At a particular pairing of pressure and temperature, identified for the purposes of this specification as the critical pairing, the microballoons undergo irreversible expansion, and expand three-dimensionally. The expansion is at an end when the internal pressure equals the external pressure. Since the polymeric shell is maintained, a closed-celled foam is achieved in this way.

A large number of types of microballoons are available commercially, such as, for example, from Akzo Nobel, the Expancel DU products (dry unexpanded), which differ essentially in their size (6 to 45 µm in diameter in the unexpanded state) and in the starting temperature they require for expansion (75° C. to 220° C.).

Furthermore, unexpanded types of microballoons are also available in the form of an aqueous dispersion, with a solids fraction or microballoon fraction of around 40% to 45% by weight, and also in the form of polymer-bound microballoons (masterbatches), for example in ethylene-vinyl acetate, with a microballoon concentration of around 65% by weight. Obtainable, furthermore, are what are called microballoon slurry systems, in which the microballoons are present in the form of an aqueous dispersion with a solids fraction of 60% to 80% by weight. The microballoon dispersions, the microballoon slurries, and the masterbatches, like the DU products, are suitable for the foaming of acrylic tapes in accordance with the process of the invention.

Methods for making a foamed layer using expandable microspheres are disclosed in WO 00/006637, U.S. Pat. No. 6,103,152 and US 2011/0281964 A1. Examples of suitable expandable microspheres include those commercially available from Pierce Stevens (Buffalo, N.Y.) under designations F30D, D80SD and F100D. Further useful expandable microspheres include Expancel 551, Expancel 461 and Expancel 091, available from Akzo Nobel or Dualite U010-185D commercially available from Henkel. Each of these microspheres has an acrylonitrile-containing shell. The non-expandable microspheres may be polymeric or non-polymeric. Particularly suitable non-expandable microspheres include hollow glass bubbles.

The foam layer should have a density of at least 150 kg/m3 or at least 300 kg/m$^3$ or at least 540 kg/m$^3$, typically at least 570 kg/m$^3$ or at least 600 kg/m$^3$. Generally, a higher density has been found to improve the performance of the adhesive tape when applied to door frames and in particular, the adhesion at areas of strong curvature may be improved. However, the density should not be so high that the foam layer looses its foam characteristics. Typically, the maximum density should not exceed 950 kg/m$^3$, or in a particular embodiment should not exceed 850 kg/m$^3$. The desired density can be obtained by the level of frothing and/or amount of hollow microspheres that is included in the composition for the foam layer.

The foam layer can have adhesive properties by itself on one or more of its major surfaces, or it can be non-adhesive on all of its major surfaces. In the latter case, at least one of the major surfaces is covered at least partially or in full by a layer of pressure sensitive adhesive layer.

The pressure-sensitive adhesive layer in accordance with the present invention comprises an acrylic-type pressure-sensitive adhesive. Useful acrylic type pressure-sensitive adhesives include those known to the person skilled in the art. Particularly useful pressure-sensitive adhesives include ultraviolet-radiation polymerized acrylic pressure-sensitive adhesives. Preferably, these pressure-sensitive adhesives are prepared from a composition comprising at least one alkyl acrylate monomer, preferably a monofunctional unsaturated acrylate ester of a non-tertiary alcohol, the molecules of which preferably have from about 4 to about 14 carbon atoms. Such monomers include, e.g., isooctyl acrylate, 2-ethyl hexyl acrylate, isononyl acrylate, decyl acrylate, dodecyl acrylate, butyl acrylate, and hexyl acrylate. The alkyl acrylate monomers can be used to form homopolymers or they can be copolymerized with polar copolymerizable monomers. When copolymerized with strongly polar copolymerizable monomers, the alkyl acrylate monomer generally comprises at least about 75% of the photopolymerizable polymers. When copolymerized with moderately polar copolymerizable monomers, the alkyl acrylate monomer generally comprises at least about 60% of the photopolymerizable polymer.

The polar copolymerizable monomers can be selected from strongly polar copolymerizable monomers such as acrylic acid, itaconic acid, hydroxyalkyl acrylates, cyanoalkyl acrylates, acrylamides or substituted acrylamides, or from moderately polar copolymerizable monomers, such as N-vinyl pyrrolidone, acrylonitrile, vinyl chloride, or diallyl phthalate. When strongly polar monomers are used, they preferably comprise from about 1 to about 25 parts, preferably from about 4 to about 20 parts of the acrylic copolymer. When moderately polar monomers are used, they preferably comprise from about 20 to about 40 parts of the acrylic copolymer.

The composition comprising the polymerizable monomers may also contain a photoinitiator in order to induce polymerization of the monomers. Useful photoinitiators include benzoin ethers, such as benzoin methyl ether or benzoin isopropyl ether, substituted benzoin ethers, such as anisole methyl ether, substituted acetophenone derivatives, such as 2,2-diethoxyacetophenone and 2,2-dimethoxy-2-phenylacetophenone, substituted alpha-ketols, such as 2-methyl-2-hydroxypropiophenone, aromatic sulfonyl chlorides, such as 2-naphthalene sulfonyl chloride and photoactive oximes, such as 1-phenyl-1-1-propenedione-2(0-ethoxycarbonyl)-oxime. Preferably, the photoinitiator is present in an amount of about 0.01 to about 1 part per hundred parts (pph) of the acrylic monomers of the pressure sensitive adhesive compositions.

The photopolymerizable composition may also contain a crosslinking agent to enhance heat-resistance. Preferred crosslinking agents for acrylic pressure-sensitive adhesives are multifunctional acrylates such as 1,6-hexanediol diacrylates as well as those disclosed in U.S. Pat. No. 4,379,201, such as trimethylolpropane triacrylate, pentaerythritol tetraacrylate, 1,2-ethylene glycol diacrylate, and 1,2-dodecanediol diacrylate. Other useful crosslinking agents include substituted triazines, such as those disclosed in U.S. Pat. No. 4,329,384, U.S. Pat. No. 4,391,687, U.S. Pat. No. 4,330,590, e.g., 2,4-bis(trichloromethyl)-6-(3,4-dimethoxyphenyl)-s-triazine and other chromophore halogen-s-triazines. When used, the crosslinking agent is present in an amount of from about 0.01 to about 1 pph, wherein pph means (additional) parts per hundred parts of the total composition.

Other useful materials which may be blended into the pressure-sensitive adhesive layer include fillers, pigments, fibrous reinforcing agents, woven and non-woven fabrics, foaming agents, antioxidants, stabilizers, fire retardants, and viscosity adjusting agents.

The pressure-sensitive adhesive layers essentially consisting of acrylic pressure sensitive adhesives may be prepared by premixing together the photopolymerizable monomers and the photoinitiator. This premix is partially polymerized to a viscosity range of from about 500 cps to about 5,000 cps, as measured according to ASTM 4016/93, to achieve a coatable syrup. Alternatively, the monomers may be mixed with a thixotropic agent such as fumed hydrophilic silica to achieve a coatable thickness. The crosslinking agent(s) and any other optional ingredients are added to the syrup prior to in situ crosslinking and polymerization.

In another embodiment the pressure sensitive adhesive layer (also called skin layer) comprises a cross-linked rubber.

The cross-linked rubber may be obtained from crosslinking, typically through e-beam, of a cross-linkable block copolymer that has a rubbery block and a glassy block. Generally, a rubbery block exhibits a glass transition temperature (Tg) of less than room temperature. In some embodiments, the Tg of the rubbery block is less than about 0° C., or even less than about −10° C. In some embodiments, the Tg of the rubbery block is less than about −40° C., or even less than about −60° C.

Generally, a glassy block exhibits a Tg of greater than room temperature. In some embodiments, the Tg of the glassy block is at least about 40° C., at least about 60° C., at least about 80° C., or even at least about 100° C.

A suitable block copolymer includes one or more a rubbery blocks, R, and one or more glassy blocks, G. In some embodiments, the block copolymer comprises at least three glassy blocks. In some embodiments, the block copolymer comprises between three and five glassy blocks, inclusive. In some embodiments, the block copolymer comprises four glassy blocks.

In some embodiments, the block copolymer is a multi-arm block copolymer having the general formula $Q_n$-Y, wherein Q represents an arm of the multi-arm block copolymer; n represents the number of arms and is a whole number of at least 3; and Y is the residue of a multifunctional coupling agent. Each arm, Q, independently has the formula R-G, wherein G represents the glassy block; and R represents the rubbery block.

In some embodiments, the rubbery block comprises a polymerized conjugated diene, a hydrogenated derivative of a polymerized conjugated diene, or combinations thereof. In some embodiments, the conjugated dienes comprise 4 to 12 carbon atoms. Exemplary conjugated dienes include butadiene, isoprene, ethylbutadiene, phenylbutadiene, piperylene, pentadiene, hexadiene, ethylhexadiene, and dimethylbutadiene. The polymerized conjugated dienes may be used individually or as copolymers with each other. In some embodiments, the conjugated diene is selected from the group consisting of isoprene, butadiene, ethylene butadiene copolymers, and combinations thereof.

In some embodiments, at least one glassy block comprises a polymerized monovinyl aromatic monomer. In some embodiments, both glassy blocks of a triblock copolymer comprise a polymerized monovinyl aromatic monomer. In some embodiments, the monovinyl aromatic monomers comprise 8 to 18 carbon atoms. Exemplary monovinyl aromatic monomers include styrene, vinylpyridine, vinyl toluene, alpha-methyl styrene, methyl styrene, dimethylstyrene, ethylstyrene, diethyl styrene, t-butylstyrene, di-n-butylstyrene, isopropylstyrene, other alkylated-styrenes, styrene analogs, and styrene homologs. In some embodiments, the monovinyl aromatic monomer is selected from the group consisting of styrene, styrene-compatible monomers or monomer blends, and combinations thereof.

As used herein, "styrene-compatible monomers or monomer blends" refers to a monomer or blend of monomers, which may be polymerized or copolymerized, that preferentially associate with polystyrene or with the polystyrene endblocks of a block copolymer. The compatibility can arise from actual copolymerization with monomeric styrene; solubility of the compatible monomer or blend, or polymerized monomer or blend in the polystyrene phase during hot melt or solvent processing; or association of the monomer or blend with the styrene-rich phase domain on standing after processing.

In the general formula for some multi-arm block copolymers of the present disclosure, $Q_n$-Y, n represents the number of arms and is a whole number of at least 3, i.e., the multi-arm block copolymer is a star block copolymer. In some embodiments, n ranges from 3 to 10. In some embodiments, n ranges from 3-5. In some embodiments, n is 4. In some embodiments, n is equal to 6 or more.

In some embodiments, the first block copolymer is a polymodal block copolymer. As used herein, the term "polymodal" means that the copolymer comprises glassy blocks having at least two different molecular weights. Such a block copolymer may also be characterized as having at least one "high" molecular weight glassy block, and at least one "low" molecular weight glassy block, wherein the terms high and low are used relative to each other. In some embodiments the ratio of the number average molecular weight of the high molecular weight glassy block, $(M_n)H$, relative to the number average molecular weight of the low molecular weight glassy block, $(M_n)L$, is at least about 1.25.

In some embodiments, $(M_n)H$ ranges from about 5,000 to about 50,000 g/mol. In some embodiments, $(M_n)H$ is at least about 8,000, and in some embodiments at least about 10,000. In some embodiments, $(M_n)H$ is no greater than about 35,000 g/mol. In some embodiments, $(M_n)L$ ranges from about 1,000 to about 10,000 g/mol. In some embodiments, $(M_n)L$ is at least about 2,000, and, in some embodiments, at least about 4,000. In some embodiments, $(M_n)L$ is less than about 9,000 g/mol, and, in some embodiments, less than about 8,000 g/mol.

In some embodiments, the first block copolymer is an asymmetric block copolymer. As used herein, the term "asymmetric" means that the arms of the block copolymer are not all identical. Generally, a polymodal block copolymer is an asymmetric block copolymer (i.e., a polymodal asymmetric block copolymer) as not all arms of a polymodal block copolymer are identical since the molecular weights of the glassy blocks are not all the same. In some embodiments, the block copolymers of the present disclosure are polymodal, asymmetric block copolymers. Methods of making asymmetric, polymodal block copolymers are described in, e.g., U.S. Pat. No. 5,296,547.

Generally, the multifunctional coupling agent may be any polyalkenyl coupling agent or other material known to have functional groups that can react with carbanions of the living polymer to form linked polymers. The polyalkenyl coupling agent may be aliphatic, aromatic, or heterocyclic. Exemplary aliphatic polyalkenyl coupling agents include polyvinyl and polyalkyl acetylenes, diacetylenes, phosphates, phosphites, and dimethacrylates (e.g., ethylene dimethacrylate). Exemplary aromatic polyalkenyl coupling agents include polyvinyl benzene, polyvinyl toluene, polyvinyl xylene, polyvinyl anthracene, polyvinyl naphthalene, and divinyldurene. Exemplary polyvinyl groups include divinyl, trivinyl, and tetravinyl groups. In some embodiments, divinylbenzene (DVB) may be used, and may include o-divinyl benzene, m-divinyl benzene, p-divinyl benzene, and mixtures thereof. Exemplary heterocyclic polyalkenyl coupling agents include divinyl pyridine, and divinyl thiophene. Other exemplary multifunctional coupling agents include silicon halides, polyepoxides, polyisocyanates, polyketones, polyanhydrides, and dicarboxylic acid esters.

Still further, the cross-linked rubber of the pressure sensitive adhesive layer may be obtained from the cross-linking of a linear block copolymer of the formula R–(G)m wherein R represents a rubbery block, G represents a glassy block, and m, the number of glassy blocks, is 1 or 2. In some embodiments, m is one, and the linear block copolymer is a diblock copolymer comprising one rubbery block and one glassy block. In some embodiments, m is two, and the linear block copolymer comprises two glassy endblocks and one rubbery midblock, i.e., the linear block copolymer is a triblock copolymer.

In some embodiments, the rubbery block of the linear block copolymer comprises a polymerized conjugated diene, a hydrogenated derivative thereof, or combinations thereof. In some embodiments, the conjugated dienes comprise 4 to 12 carbon atoms. Exemplary conjugated dienes useful in the second block copolymer include any of the exemplary conjugated dienes described above.

In some embodiments, at least one glassy block, and in some embodiments, each glassy block of the linear block copolymer comprises a polymerized monovinyl aromatic monomer. In some embodiments, the monovinyl aromatic monomers comprise 8 to 18 carbon atoms. Exemplary polymerized monovinyl aromatic monomers useful in the second block copolymer include any of the exemplary polymerized monovinyl aromatic monomer, as described above.

In a particular embodiment a mixture of the linear block copolymer and the aforementioned and described multi-arm block copolymer is used to obtain the cross-linked rubber of the pressure sensitive adhesive layer. In some embodiments, the ratio of multi-arm block copolymers to linear block copolymers ranges from 1.5:1 to 9:1. In some embodiments, the ratio of multi-arm block copolymers to linear block copolymer is at least 1.85:1, or even at least 3:1. In some embodiments, the ratio of multi-arm block copolymers to linear block copolymers is no greater than 5.7:1, or even no greater than 4:1.

The pressure sensitive adhesive layer in a particular embodiment further includes one or more tackifiers and optionally one or more plasticizers. Generally, a tackifier will be selected to be compatible with a rubbery block of a block copolymer as may be used for obtaining the cross-linked rubber. As used herein, a tackifier is "compatible" with a block if it is miscible with that block. Generally, the miscibility of a tackifier with a block can be determined by measuring the effect of the tackifier on the Tg of that block. If a tackifier is miscible with a block it will alter (e.g., increase) the Tg of that block.

A tackifier is "primarily compatible" with a block if it is at least miscible with that block, although it may also be miscible with other blocks. For example, a tackifier that is primarily compatible with a rubbery block will be miscible with the rubbery block, but may also be miscible with a glassy block.

Generally, resins having relatively low solubility parameters tend to associate with the rubbery blocks; however, their solubility in the glassy blocks tends to increase as the molecular weights or softening points of these resins are lowered. Exemplary tackifiers that are primarily compatible with the rubbery blocks include polymeric terpenes, heterofunctional terpenes, coumarone-indene resins, esters of rosin acids, disproportionated rosin acid esters, hydrogenated rosin acids, C5 aliphatic resins, C9 hydrogenated aromatic resins, C5/C9 aliphatic/aromatic resins, dicyclopentadiene resins, hydrogenated hydrocarbon resins arising from C5/C9 and dicyclopentadiene precursors, hydrogenated styrene monomer resins, and blends thereof.

In particular embodiments, a first high Tg tackifier having a glass transition temperature (Tg) of at least 60 degrees Celsius (° C.). As used herein, the terms "high glass transition temperature tackifier" and "high Tg tackifier" refers to a tackifier having a glass transition temperature of at least 60° C. In some embodiments, the first high Tg tackifier has a Tg of at least 65° C., or even at least 70° C. In some embodiments, the first high Tg tackifier has a softening point of at least about 115° C., and, in some embodiments, at least about 120° C.

In some embodiments, the block copolymer adhesive compositions include a second high Tg tackifier that is primarily compatible with the glassy block(s) of the multi-arm block copolymer and, optionally, with the glassy block (s) of the linear block copolymer. Generally, a tackifier that is primarily compatible with a glassy block is miscible with the glassy block and may be miscible with a rubbery block.

Generally, resins having relatively high solubility parameters tend to associate with the glassy blocks; however, their solubility in the rubbery blocks tends to increase as the molecular weights or softening points of these resins are lowered. Exemplary tackifiers that are primarily compatible with the glassy blocks include coumarone-indene resins, rosin acids, esters of rosin acids, disproportionated rosin acid esters, C9 aromatics, alpha-methyl styrene, C9/C5 aromatic-modified aliphatic hydrocarbons, and blends thereof.

In some embodiments, the pressure sensitive adhesive layer further comprises at least one component selected from the group consisting of a low Tg tackifier, a plasticizer, and combinations thereof. As used herein, the term "low glass transition temperature tackifier" refers to a tackifier having a glass transition temperature of less than 60° C.

Exemplary low Tg tackifiers include polybutenes.

Generally, a plasticizer is compatible with one or more blocks of the linear block copolymer, and/or one or more blocks of the multi-arm block copolymer. Generally, a plasticizer that is compatible with a block will be miscible with that block and will lower the Tg of that block. Exemplary plasticizers include naphthenic oils, liquid polybutene resins, polyisobutylene resins, and liquid isoprene polymers.

In some embodiments, the ratio of the total amount of high glass transition temperature tackifiers to block copolymers ranges from 0.8:1 to 1.25:1. In some embodiments, the ratio of the total amount of high Tg tackifiers to block copolymers is at least 0.85:1, or even at least 0.9:1. In some embodiments, the ratio of the total amount of high Tg tackifiers to block copolymers is no greater than 1.15:1, or even no greater that 1.1 to 1.

In some embodiments, the ratio of the rubbery block compatible high Tg tackifier to the glassy block compatible high Tg tackifier is ranges from 1:1 to 9:1. In some embodiments, the ratio of the rubbery block compatible high Tg tackifier to the glassy block compatible high Tg tackifier is at least 1.25:1, or even at least 1.5:1. In some embodiments the ratio of the rubbery block compatible high Tg tackifier to the glassy block compatible high Tg tackifier is no greater than 4:1, or even no greater than 3:1.

In a particularly preferred embodiment, the pressure sensitive adhesive layer also includes an acrylic pressure sensitive adhesive component. Typically, the pressure sensitive adhesive layer comprises at least about 0.1 parts, in some embodiments, at least about 0.5 parts, at least about 1 part, or even at least about 2 parts of an acrylic pressure sensitive adhesive component.

In a particular embodiment, the pressure sensitive adhesive layer comprise no greater than about 10 parts, in some embodiments, no greater than about 8 parts, no greater than about 5 parts, or even no greater than about 4 parts of the acrylic pressure sensitive adhesive component. The amount of cross-linked block copolymer will typically be between 30 and 60 or between 30 and 50 parts by weight of the total weight of the pressure sensitive adhesive layer.

In another embodiment, the acrylic pressure sensitive adhesive component may be comprised in the pressure sensitive adhesive layer in an amount of between 40 and 60 parts by weight. In this embodiment, the amount of cross-linked block copolymer will typically be between 10 and 20 parts by weight of the weight of the pressure sensitive adhesive layer.

Typically, the acrylic pressure sensitive adhesive component of the pressure sensitive adhesive layer is an acrylic polymer derived from one or more acrylic esters of a non-tertiary alkyl alcohol that contains 3 to 14 carbon atoms. Exemplary acrylic acid esters include isooctyl acrylate, 2-ethylhexyl acrylate, butyl acrylate, isobornyl acrylate, and combinations thereof. Exemplary methacrylic acid esters include the methacrylate analogues of these acrylic acid esters. Typically, the acrylic polymer will further comprise one or more units derived from a polar monomer such as for example described above.

In some embodiments, the acrylic polymer comprises at least about 70 parts, in some embodiments, at least about 80 parts, at least about 90 parts, at least about 95 parts, or even about 100 parts of at least one acrylic or methacrylic ester of a non-tertiary alkyl alcohol.

In some embodiments, acrylic polymer comprises no greater than about 30 parts, in some embodiments, no greater than about 20 parts, no greater than about 10 parts, no greater than about 5 parts, and even no greater than 1 part of at least one copolymerized polar monomer. In some embodiments, the acrylic adhesive composition does not include a copolymerized polar monomer.

In some embodiments, the ratio of the combination of the block copolymers and high Tg tackifiers to the acrylic pressure sensitive adhesive component is at least 8.3:1. In some embodiments, the ratio of the combination of the block copolymers and high Tg tackifiers to the acrylic pressure sensitive adhesive component is at least 12.5:1, at least 22:1, at least 90:1, or even at least 180:1.

In some embodiments, the ratio of the combination of the block copolymers, high Tg tackifiers, and acrylic pressure sensitive adhesive component to the liquid plasticizer ranges from 32:1 to 10:1. In some embodiments, the ratio of the combination of the block copolymers, high Tg tackifiers, and acrylic pressure sensitive adhesive component to the liquid plasticizer is no greater than 25:1, or even no greater than 20:1. In some embodiments, the ratio of the combination of the block copolymers, high Tg tackifiers, and acrylic pressure sensitive adhesive component to the liquid plasticizer is at least 12.5:1.

Construction and Method of Making

The adhesive tape of the present invention is particularly useful for attaching rubber articles (by means of the heat-activatable layer) to a variety of surfaces (by means of the pressure-sensitive adhesive layer), as is desired in the automotive industry. The heat-activatable layer of the adhesive tape in accordance with the present invention provides excellent adhesion to a wide variety of rubbers and low surface energy elastomers.

In order to bond a rubber article for example a shaped rubber article to the heat activatable layer, an optional support layer on the first main surface may be removed. Lamination may be performed according to methods known in the art using conventional heat-bond laminating equipment, such as a Heat-Bond-Laminator Model TE 2417 available from EHVO GmbH, Germany. Typically, a sufficient amount of heat is first applied in order to activate the heat-activatable layer. For instance, the heat activatable layer may be preheated using an atmosphere of air having a temperature of up to about 650° C. The pre-activated tape is laminated to the desired rubber article using an appropriate amount of pressure. The pressure-sensitive adhesive layer may serve to finally attach the resulting composite article to a variety of surfaces, for instance to a metal surface of a car. Instead of using an atmosphere of air having a temperature of up to about 650° C., it is also possible to use IR or NIR lamination, where the layer is activated by IR or NIR radiation.

FIG. 1 is a cross sectional view of a first embodiment of a taped seal construction 1 for a body part of a vehicle according to the invention. The taped seal construction 1 comprises a main portion 2 and a lip portion 3. The main portion 2 has a tubular construction with a hollow interior. The main portion 2 has an essentially round shape with a flattened section 8. The lip portion 3 has an elongated, curved shape. The lip portion 3 is attached to the main portion 2 at one end of the flattened section 8 and extends essentially along the flattened section 8 thereby enclosing a space 9 with an opening 11. The other end of the lip portion 3 is directed towards the opening of the space 9.

The tape 4 of the taped seal construction 1 is attached to the base portion 2 at its flattened section 8 facing the lip portion. In other words the tape 4 is positioned in the space 9, which is build by the main portion 2 and the lip portion 3. The tape 4 comprises at least one adhesive layer 5 and a liner 6. The liner is split at a cut 7, which divides the liner 6 in two parts a first part 6' with a smaller width and a second part 6" with a bigger width. The part 6' is located closer to the side of the main portion 2 where the lip portion is fixed.

Figure 2:
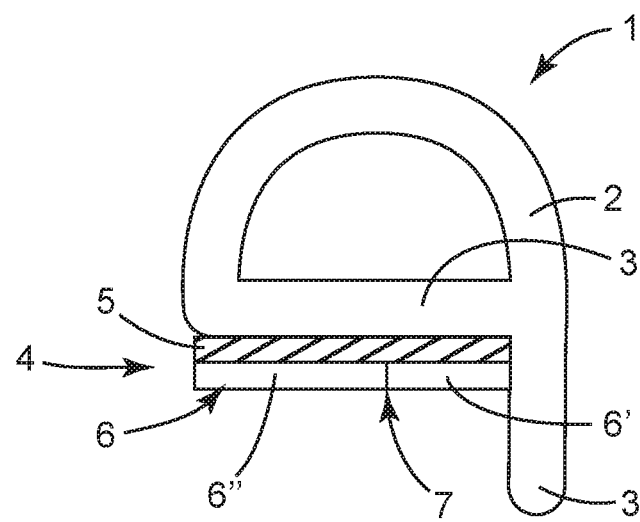
FIG. 2 is a cross sectional view of a second embodiment of a taped seal construction for a body part of a vehicle according to the invention with an elongated lip portion.

FIG. 2 is a cross sectional view of a second embodiment of a taped seal construction 1 for a body part of a vehicle according to the invention. The taped seal construction of FIG. 2 differs from that shown in FIG. 1 in that the lip portion 3 has a generally straight, elongated shape that extends essentially perpendicular to the main surface of the adhesive tape 4. The tape 4 comprises at least one adhesive layer 5 and a liner 6. The liner is split at a cut 7, which divides the liner 6 in two parts a first part 6' with a smaller width and a second part 6" with a bigger width. The part 6' is located closer to the side of the main portion 2 where the lip portion is fixed.

The two embodiments described above provide the possibility to first remove the first part 6' of the liner, adhere the taped seal construction 1 to a body part of a vehicle, check the position of the taped seal construction 1 relative to the body part of the vehicle, correct the position of the taped seal construction 1, if necessary and remove the second part of the liner.

The invention claimed is:

1. Taped seal construction for a body part of a vehicle, comprising
    a seal with a main portion and a lip portion, the main portion being designed to extend on one side of the body part of the vehicle and the lip portion being designed to extend on another side of the body part of the vehicle thereby covering an edge of the body part, and
    an adhesive tape attached to the main portion of the seal, with the tape comprising an adhesive covered by a split liner having a first liner part and a second liner part that are split such that the first liner part has a smaller width than the second liner part, in a cross sectional view perpendicular to the direction of the longitudinal extension of the taped seal construction, wherein the first liner part of the split liner is closer to the lip portion of the seal than the second liner part.

2. Taped seal construction according to claim 1, wherein the seal is made out of ethylene-propylene copolymers, ethylene propylene-diene terpolymers and/or styrene-butadiene copolymers.

3. Taped seal construction according to claim 1, wherein the tape comprises a heat-activatable adhesive layer and a pressure-sensitive adhesive layer, wherein the heat-activatable adhesive layer faces the main portion of the seal.

4. Taped seal construction according to claim 3, wherein the heat-activatable adhesive layer is a resin layer, wherein the resin is a polymer of one or more monomers selected from the group consisting of olefins.

5. Taped seal construction according to claim 3, wherein the pressure-sensitive adhesive layer comprises an acrylic-type pressure sensitive adhesive.

6. Taped seal construction according to claim 1, wherein the lip portion covers the tape with the liner thereby enclosing a space with an opening.

7. Taped seal construction according to claim 1, wherein the lip portion extends in a direction essentially perpendicular to the tape.

8. Taped seal construction according to claim 1, wherein the liner is completely split such that the liner consists of at least two parts.

9. Taped seal construction according to claim 1, wherein the liner is split along the direction of the longitudinal extension of the taped seal construction.

10. Method of applying a taped seal construction according to claim 1 to a body part of a vehicle, the method comprising:
    removing the first liner part of the liner,
    applying the taped seal construction to the body part of the vehicle with that portion of the tape that was covered by the first liner part of the liner,
    checking the position of the taped seal construction,
    correcting the position of the taped seal construction, if necessary,
    removing the second liner part of the liner and
    applying the taped seal construction to the body part of the vehicle with that portion of the tape that was covered by the second liner part of the liner.

11. Motor vehicle comprising a taped seal construction according to claim 1.

12. Taped seal construction according to claim 2, wherein the tape comprises a heat-activatable adhesive layer and a pressure-sensitive adhesive layer, wherein the heat-activatable adhesive layer faces the main portion of the seal.

13. Taped seal construction according to claim 3, wherein the lip portion covers the tape with the liner thereby enclosing a space with an opening.

14. Taped seal construction according to claim 8, wherein the lip portion extends in a direction essentially perpendicular to the tape.

15. Taped seal construction according to claim 6, wherein the liner is completely split such that the liner consists of at least two parts.

16. Taped seal construction according to claim 13, wherein the liner is completely split such that the liner consists of at least two parts.

17. Taped seal construction according to claim 14, wherein the liner is completely split such that the liner consists of at least two parts.

18. Taped seal construction according to claim 8, wherein the liner is split along the direction of the longitudinal extension of the taped seal construction.

19. Taped seal construction according to claim 15, wherein the liner is split along the direction of the longitudinal extension of the taped seal construction.

\* \* \* \* \*

UNITED STATES PATENT AND TRADEMARK OFFICE
CERTIFICATE OF CORRECTION

PATENT NO. : 10,029,550 B2
APPLICATION NO. : 14/898963
DATED : July 24, 2018
INVENTOR(S) : Detlef Richert Page 1 of 1

It is certified that error appears in the above-identified patent and that said Letters Patent is hereby corrected as shown below:

In the Specification

Column 1
Line 32, delete "gab" and insert -- gap --, therefor.

Column 4
Line 13, delete "Petrochemichals)," and insert -- Petrochemicals), --, therefor.

Column 5
Line 25, delete "liner" and insert -- liner; --, therefor.

Column 6
Line 3, delete "my" and insert -- may --, therefor.

Column 7
Line 3, delete "2-methy-" and insert -- 2-methyl- --, therefor.

Column 8
Line 31-32, delete "2,2 dimethoxy" and insert -- 2,2-dimethoxy --, therefor.

Column 11
Line 31 (approx.), delete "1-propenedione" and insert -- 1-propanedione --, therefor.

Signed and Sealed this
Twentieth Day of November, 2018

Andrei Iancu
*Director of the United States Patent and Trademark Office*